United States Patent [19]

von Bredow et al.

[11] 3,925,379
[45] Dec. 9, 1975

[54] N-(SUBSTITUTED PHENYL)-2,3-DIAZABICYCLO[2.2.2]OCT-5-ENE AND [2,2.1]HEPT-5-ENE,2,3-DICARBOXIMIDES

[75] Inventors: Brigitta von Bredow, Binningen; Hans U. Brechbühler, Basel, both of Switzerland

[73] Assignee: Ciba-Geigy Corporation, Ardsley, N.Y.

[22] Filed: Aug. 22, 1973

[21] Appl. No.: 390,648

[30] Foreign Application Priority Data
Sept. 1, 1972 Switzerland............... 12920/72
Aug. 3, 1973 Switzerland............... 11302/73

[52] U.S. Cl............ 260/250 AC; 424/200; 424/250
[51] Int. Cl.².................................... C07D 237/26
[58] Field of Search......................... 260/250 AC

[56] References Cited
UNITED STATES PATENTS
2,813,866  11/1957  Clarke et al............... 260/250 A
3,127,400  3/1964   Snyder....................... 260/250 A
3,644,362  2/1972   Carabateas................ 260/250 A OTHER PUBLICATIONS
Meyers, Chemical Abstract, 78:58213y (1973).

Primary Examiner—Richard J. Gallagher
Assistant Examiner—Ánne Marie T. Tighe
Attorney, Agent, or Firm—Harry Falber; Frederick H. Rabin

[57] ABSTRACT

Compounds of the formula

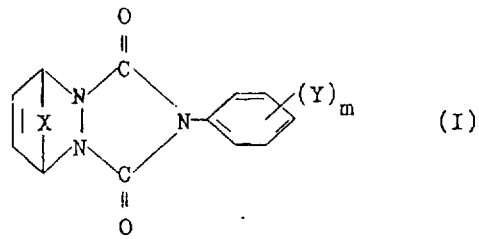

wherein X represents —$CH_2$— or $CH_2$—$CH_2$—, Y represents chlorine, cyano, or trifluoromethyl, and $m$ is a number from 1 to 3, and their use as insecticides are disclosed.

11 Claims, No Drawings

N-(SUBSTITUTED PHENYL)-2,3-DIAZABICYCLO[2.2.2]OCT-5-ENE AND [2,2.1]HEPT-5-ENE,2,3-DICARBOXIMIDES

The present invention relates to dicarboximides, a process for their manufacture, and to their use in pest control.

The dicarboximides have the formula

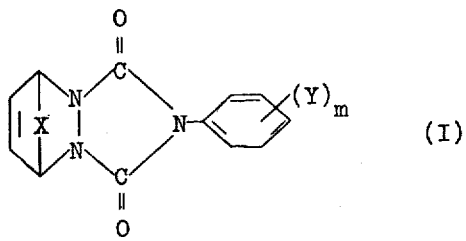

wherein X represents $-CH_2-$ or $CH_2-CH_2-$, Y represents chlorine, cyano, or trifluoromethyl, and $m$ is a number from 1 to 3.

Preferred compounds on account of their activity are those of the formula I, wherein X represents $-CH_2-$, Y represents chlorine or trifluoromethyl, and $m$ is 1 or 2.

The compounds of the formula I are manufactured by processes which are known per se, e.g. by reacting a 1,2,4-triazolidine-3,5-dione of the formula

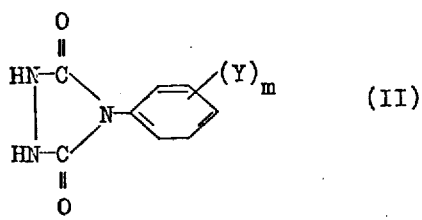

in the presence of an oxidant with a compound of the formula

in which X, Y, and $m$ have the meanings given for the formula I.

As oxidants there can be used, for example, N-bromo-succinimide, hypohalites, e.g. hypochlorites (tert. butylhypochlorite), nitric oxides, e.g. dinitrogen tetroxide, peracids and salts thereof, e.g. persulphates, peracetates, chlorates, perchlorates, and iodine. However, preferred oxidants are lead tetraacetate, lead dioxide, or manganese dioxide.

It is advisable in many cases, chiefly whenever inert polyenes are used, to add a Lewis acid, e.g. $AlCl_3$, to the reaction mixture.

The reaction is carried out at normal pressure, at a temperature between $-100°C$ and $+100°C$, preferably between $-50°C$ and $+50°C$, and in inert solvents or diluents, for example in halogenated alkanes, ketones, or ethers, but preferably in methylene chloride.

Some of the starting materials of the formulae II and III are known or they can be manufactured by methods analogous to known ones.

Thus it is possible to obtain e.g. the compounds of the formula II by reaction of corresponding phenylisocyanates with carbazinic esters and subsequent cyclisation [Arch. Pharm. 294, 370 ff. (1961)].

The compounds of the formula I are suitable for combating a variety of animal and plant pests. They are suitable in particular for combating harmful insects. They can be used for example against insects which are harmful in the fields of hygiene, storage protection, and plant protection.

The insecticidal action can be substantially broadened and adapted to given circumstances by the addition of other insecticides and/or acaricides. Suitable additives include, for example: organic phosphorus compounds, nitrophenols, formamidines, ureas, carbamates, and chlorinated hydrocarbons.

The compounds of the formula I may be used as pure active substance or together with suitable carriers and/or additives. Suitable carriers and additives can be solid or liquid and correspond to the substances conventionally used in formulation technique, for example natural or regenerated substances, solvents, dispersants, wetting agents, adhesives, thickeners, binders and/or fertilisers.

For application, the compounds of the formula I may be processed to dusts, emulsion concentrates granules, dispersions, sprays, to solutions, or suspensions, in the conventional formulation which is commonly employed in application technology.

The agents according to the invention are manufactured in known manner by intimately mixing and/or grinding active substances of the formula I with the suitable carriers, optionally with the addition of dispersants or solvents which are inert towards the active substances. The active substances may take, and be used in, the following forms:

Solid forms:
Dusts, tracking agents, granules, coated granules, impregnated granules and homogeneous granules.

Liquid forms:
a. active substances which are dispersible in water: wettable powders, pasts, emulsions:
b. solutions.

The content of active substance in the above described agents is between 0 and 95%.

The active substances of the formula I can, for example, be formulated as follows:

Dusts

The following substances are used to manufacture (a) a 5% and (b) a 2% dust:
 a. 5 parts of active substance 95 parts of talcum
 b. 2 parts of active substance 1 part of highly disperse silicic acid 97 parts of talcum.

The active substances are mixed with the carriers and ground.

Granules

The following substances are used to produce 5 % granules:
 5 parts of active substance,
 0.25 parts of epichlorohydrin,
 0.25 parts of cetyl polyglycol ether,
 3.50 parts of polyethylene glycol,
 91 parts of kaolin (particle size 0.3 - 0.8 mm).

The active substance is mixed with epichlorohydrin and dissolved with 6 parts of acetone; the polyethylene glycol and cetyl polyglycol ether are then added. The thus obtained solution is sprayed on kaolin, and the acetone subsequently evaporated in vacuo.

Bait granules:
 2 parts of active substance
 0.05 part of a colouring matter
 1 part of celite or kaolin are mixed and finely ground. To this mixture are then added
 96.85 parts of crystallised sugar and the whole mixture is then impregnated with 0.1 part of an adhesive dissolved e.g. in a small amount of isopropanol, and the solvent is then evaporated.

Wettable powder:
The following constituents are used for the preparation of (a) a 40%, (b) and (c) a 25%, and d) a 10% wettable powder:

a.
 40 parts of active substance,
 5 parts of sodium lignin sulphonate,
 1 part of sodium dibutyl-naphthalene sulphonate,
 54 parts of silicic acid.

b.
 25 parts of active substance,
 4.5 parts of calcium lignin sulphonate,
 1.9 parts of Champagne chalk/hydroxyethyl cellulose mixture (1:1),
 1.5 parts of sodium dibutyl naphthalene sulphonate,
 19.5 parts of silicic acid,
 19.5 parts of Champagne chalk,
 28.1 parts of kaolin.

c.
 25 parts of active substance,
 2.5 parts of isooctylphenoxy-polyoxyethylene-ethanol,
 1.7 parts of Champagne chalk/hydroxyethyl cellulose mixture (1:1),
 8.3. parts of sodium aluminium silicate,
 16.5 parts of kieselguhr,
 46 parts of kaolin.

d.
 10 parts of active substance,
 3 parts of a mixture of the sodium salts of saturated fatty alcohol sulphates,
 5 parts of naphthalenesulphonic acid/formaldehyde condensate,
 82 parts of kaolin.

The active substances are intimately mixed, in suitable mixers, with the additives, the mixture being then ground in the appropriate mills and rollers. Wettable powders are obtained which can be diluted with water to give suspensions of any desired concentration.

Emulsifiable concentrates:
The following substances are used to produce (a) a 10% and (b) a 25% emulsifiable concentrate:

a.
 10 parts of active substance,
 3.4 parts of epoxidised vegetable oil,
 13.4 parts of a combination emulsifier consisting of fatty alcohol polyglycol ether and alkylaryl-sulphonate calcium salt,
 40. parts of dimethylformamide,
 43.2 parts of xylene.
 25 parts of active substance,
 2.5 parts of epoxidised vegetable oil,
 10. parts of an alkylarylsulphonate/fatty alcohol-polyglycol ether mixture,
 5 parts of dimethylformamide,
 57.5 parts of xylene.

From these concentrates it is possible to produce, by dilution with water, emulsions of any desired concentration.

Spray:
The following constituents are used to prepare a 5% spray:
 5 parts of active substance,
 1 part of epichlorohydrin,
 94 parts of benzine (boiling limits 160° – 190°C).

EXAMPLE 1

Manufacture of N-(4'-chlorophenyl)-2,3-diazabicyclo [2,2,1]-hept-5-ene-2,3-dicarboximide 6-6 g of freshly distilled cyclopentadiene are added at −8°C to 21-15 g of 4-(p-chlorophenyl)-1,2,4-triazolidine-3,5-dione in 350 ml of absolute methylene chloride. While stirring, 44 g of lead tetraacetate dissolved in 350 ml of absolute methylene chloride are then added dropwise over the course of 4 hours and stirring is continued for 1½ hours at 0°C. Undissolved substance is then filtered off and the solvent is evaporated at a bath temperature of 10°C. The oily residue is well stirred with 200 ml of water. The water is then isolated from the crystalline product and the crystals are dried in the air. Recrystallisation from absolute methylene chloride yields the compound of the formula

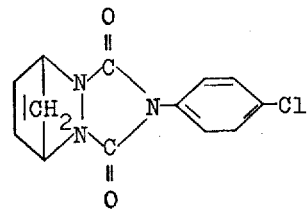

with a melting of 147°C.

The following compounds are obtained in analogous manner:

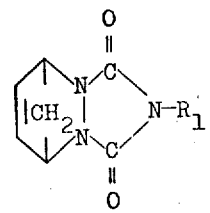

| $R_1$ | Melting Point °C |
| --- | --- |
| 3-chlorophenyl | 155 |
| 2,4-dichlorophenyl | 185 |
| 3,5-dichlorophenyl | 200 |
| 3-trifluoromethylphenyl | 125 |
| 3,4-dichlorophenyl | 156 |
| 2,3-dichlorophenyl | 181 |
| 3-chloro-4-trifluoromethylphenyl | 130 |
| 2,4,5-trichlorophenyl | 180 |
| 2,5-dichlorophenyl | 179 |
| 3-trifluoromethyl-4-chlorophenyl | 132 |
| 2,3,4-trichlorophenyl | |
| 4-cyanophenyl | |
| 3,4,5-trichlorophenyl | |

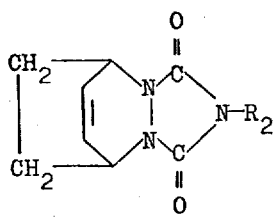

| R₂ | Melting Point °C |
|---|---|
| 4-chlorophenyl | 153 |
| 3,5-dichlorophenyl | 119 |
| 3-trifluoromethylphenyl | 119 |
| 3,4-dichlorophenyl | 153 |
| 3-chloro-4-trifluoromethylphenyl | 154 – 156 |

EXAMPLE 2

Insecticidal action against *Spodoptera littoralis*

15 cm high cotton plants were sprayed with 25 ml of a solution (acetone/water 1:1) containing 0.1% of active substance. After the solution had dried, each plant was populated with five Spodoptera caterpillars (3rd stage). A plastic cylinder was then slipped over the plant and sealed with a copper gauze cover. The mortality was determined after 2 days. In this test the compounds according to Example 1 exhibited good action against *Spodoptera littoralis*.

EXAMPLE 3

Insecticidal action against *Leptinotarsa decemlineata*

15 cm high potato plants were sprayed with a solution (acetone/water 1:1) containing 0.05% of active substance. After the solution had dried, each plant was populated with 10 Leptinotarsa larvae (3rd. stage). A plastic cylinder was slipped over the plant and sealed with a copper gauze cover. The mortality was determinated after 2 days.

In this test the compounds according to Example 1 exhibited good action against *Leptinotarsa decemlineata*.

EXAMPLE 4

Insecticidal action against *Phyllodromia germanica*

A feed consisting of 6 parts of sugar, 6 parts of powdered milk, and 1 part of powdered egg was treated with a solution of the active substance in acetone so that the concentration of the active substance in the feed was 1%. After the feed had been mixed the acetone was evaporated. Then feed, water, and freshly hatched larvae were put into a jam jar. The mortality was determined after 10 days.

In this test the compounds according to Example 1 exhibited good action against *Phyllodromia germanica*.

EXAMPLE 5

Insecticidal action against *Tribolium castaneum*

50 g of wheaten flour were mixed with a specific amount of a dust containing 5% of active substance so that the concentration was 0.01%. 25 beetles at a time were put into beakers containing 25 g of flour and 3 days later the flour was sieved. The eggs deposited in the flour constituted the infected material. The mortality was determined after 3 months.

In this test the compounds according to Example 1 exhibited good action against *Tribolium castaneum*.

We claim:

1. A compound of the formula

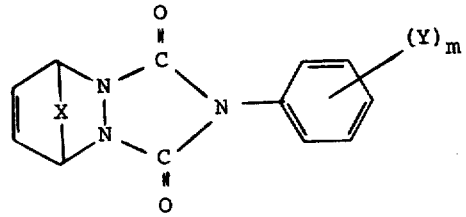

wherein X represents $-CH_2-$ or $-CH_2-CH_2-$, Y represents chlorine, or trifluoromethyl, and m is a number from 1 to 3 with the proviso that only one Y is trifluoromethyl.

2. N-(3'chlorophenyl)-2,3-diazabicyclo[2.2.1]hept-5-ene-2,3-dicarboximide, according to claim 1.

3. N-(2',4'-dichlorophenyl)-2,3-diazabicyclo[2.2.1]hept-5-ene-2,3-dicarboximide, according to claim 1.

4. N-(3'-4'-dichlorophenyl)-2,3-diazabicyclo[2.2.1]hept-5-ene-2,3-dicarboximide, according to claim 1.

5. N-(3'-trifluoromethylphenyl)-2,3-diazabicyclo[2.2.1]hept-5-ene-2,3-dicarboximide, according to claim 1.

6. N-(3',5'-dichlorophenyl)-2,3-diazabicyclo[2.2.1]hept-5-ene-2,3-dicarboximide, according to claim 1.

7. N-(2',3'-dichlorophenyl)-2,3-diazabicyclo[2.2.1]hept-5-ene-2,3-dicarboximide, according to claim 1.

8. N-(3'-chloro-4'-trifluoromethylphenyl)-2,3-diazabi-cyclo-[2.2.1]hept-5-ene-2,3-dicarboximide, according to claim 1.

9. N-(3'-trifluoromethyl-4'-chlorophenyl)-2,3-diazabicyclo-[2.2.1]hept-5-ene-2,3-dicarboximide, according to claim 1.

10. N-(3',5'-dichlorophenyl)-2,3-diazabicyclo[2.2.2]oct-5-ene-2,3-dicarboximide, according to claim 1.

11. N-(3'4'-dichlorophenyl)-2,3-diazabicyclo[2.2.2]-oct-5-ene-2,3-dicarboximide, according to claim 1.

* * * * *